United States Patent [19]

Kretschmer

[11] Patent Number: 5,351,480
[45] Date of Patent: Oct. 4, 1994

[54] JET ENGINE

[75] Inventor: Joachim Kretschmer, Feldafing, Fed. Rep. of Germany

[73] Assignee: Deutsche Aerospace AG, Fed. Rep. of Germany

[21] Appl. No.: 89,335

[22] Filed: Jul. 12, 1993

[30] Foreign Application Priority Data

Jul. 11, 1992 [DE] Fed. Rep. of Germany ........ 4222947

[51] Int. Cl.$^5$ ................................................ F02K 1/00
[52] U.S. Cl. .......................................... 60/271; 60/225; 60/262; 60/270.1; 239/265.11; 239/265.17; 239/265.23
[58] Field of Search ...................... 60/225, 262, 270.1, 60/271; 239/265.11, 265.17, 265.23, 265.29

[56] References Cited

U.S. PATENT DOCUMENTS

| 2,955,414 | 10/1960 | Hausmann | 60/270.1 |
|---|---|---|---|
| 2,988,878 | 6/1961 | Hopper | 60/262 |
| 3,041,822 | 7/1962 | Embree | 60/262 |
| 3,841,091 | 10/1974 | Sargisson et al. | 60/271 |
| 3,897,001 | 7/1975 | Helmintoller et al. | 239/265.23 |
| 4,162,040 | 7/1979 | Carey | 60/271 |
| 4,527,388 | 7/1985 | Wallace, Jr. | 60/204 |
| 4,537,026 | 8/1985 | Nightingale | 239/265.17 |
| 4,919,364 | 4/1990 | John et al. | 60/270.1 |
| 5,058,377 | 10/1991 | Wildner | 60/225 |
| 5,159,809 | 11/1992 | Ciais et al. | 60/225 |

FOREIGN PATENT DOCUMENTS

| 3427169 | 1/1986 | Fed. Rep. of Germany | 60/271 |
|---|---|---|---|
| 4010471 | 10/1991 | Fed. Rep. of Germany | . |
| 4012212 | 10/1991 | Fed. Rep. of Germany | . |
| 2139705 | 11/1984 | United Kingdom | 60/264 |
| 2157371 | 10/1985 | United Kingdom | 60/225 |

Primary Examiner—Richard A. Bertsch
Assistant Examiner—Howard R. Richman
Attorney, Agent, or Firm—Evenson, McKeown, Edwards & Lenahan

[57] ABSTRACT

A jet engine having at least one combustion chamber with a propelling nozzle connected behind it, achieves in a constructionally simple manner and with a high propulsion effect a cross-sectional configuration of a hot gas flow duct bounded by the propelling nozzle that is highly variable with respect to the nozzle throat area as well as to the outlet area. The propelling nozzle contains a divergent lengthening part which is axially movable for the outlet-side expansion of the hot-gas flow duct. In the moved-out position, the lengthening part connects essentially in the corresponding shape to the divergent outlet end of the nozzle outer wall fixed to the engine and, in the moved-in condition, forms together with it an air outlet duct which encloses the fixed nozzle wall end in a ring-shaped manner and whose cross-section can be regulated. In the lower flying speed range, where the propelling nozzle lengthening is not required for the expansion of the outer contour of the hot gas flow duct, a secondary air injection takes place that is uniform along the whole outer circumference of the fixed nozzle end, and in addition, in the interior of the propelling nozzle, for the interior bounding of the hot gas flow duct, a mushroom-shaped central body is arranged which, with its largest cross-section can be axially adjusted between the plane of the smallest cross-sectional surface of the fixed nozzle outer wall and the outlet plane of the moved-out nozzle lengthening.

18 Claims, 2 Drawing Sheets

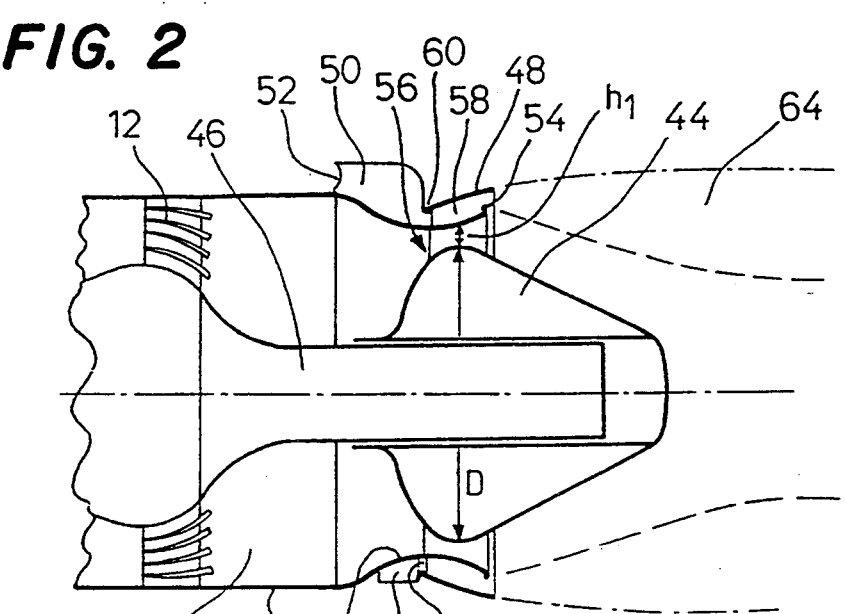
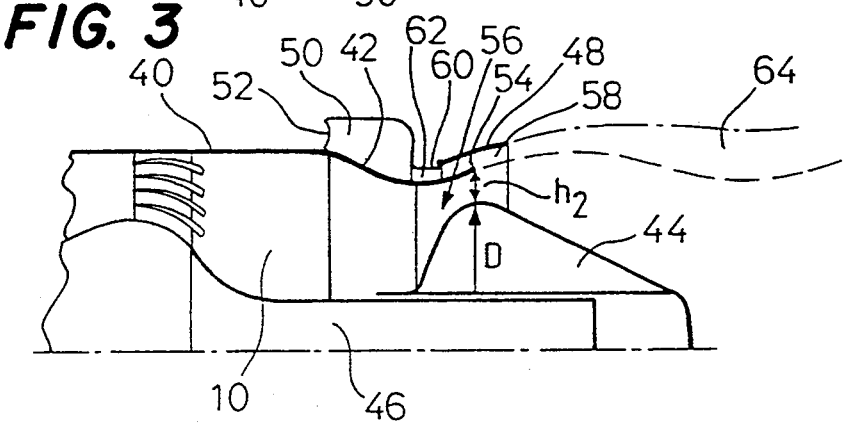
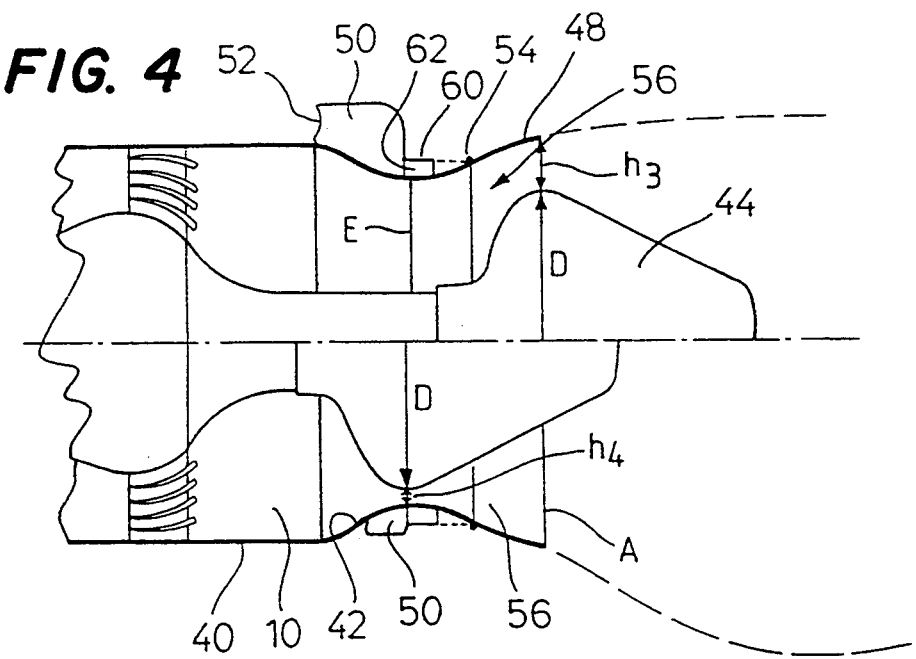

JET ENGINE

BACKGROUND AND SUMMARY OF THE INVENTION

This invention relates to a jet engine and, more particularly, to a hypersonic ducted engine having at least one combustion chamber and a propelling nozzle connected behind it, with a nozzle outer wall which is fixed to the engine and is divergent in the direction of the nozzle outlet end. An axially movable propelling nozzle adjusting part for the bounding of a hot gas flow duct is provided with a variable cross-section, From U.S. Pat. No. 4,527,388, a ducted fan engine is known which comprises a convergent propelling nozzle and a mushroom-shaped central body. The central can be axially adjusted for changing the nozzle throat cross-section in the interior of the nozzle. The outer cold-air flow guided around the basic engine can be admixed to the hot-gas flow carried through the propelling nozzle by way of an air outlet duct which is arranged at the nozzle outlet end and has an outer boundary wall which convergently encloses the propelling nozzle. The boundary wall can be axially adjusted for the regulating of the effective air duct cross-section and thus of the cold-air/hot-gas flow ratio independently of the central body. A ducted fan engine of this type comprising a propelling nozzle which is convergent at the outlet end and can be adjusted for an adaptation to different double-flow quantity ratios for an operative range which is limited with respect to the flying altitude and flying speed is not the object of the invention.

Furthermore, from German Patent Documents DE 40 10 471 A1 and DE 40 12 212 A1, hypersonic ducted engines of the claimed type are known which, at low flying speeds of up to approximately Mach 3, operate as a turbojet engine and in the upper speed range of between Mach 3 and approximately Mach 7 operate as a ramjet engine. Therefore, these engines require propelling nozzles which, with respect to the narrowest area of cross-section as well as with respect to the expansion ratio, have a very high variation range and, for this purpose, in addition to a mushroom-shaped central body which can be adjusted for changing the nozzle throat cross-section axially between the inlet and outlet cross-section of the divergent outer wall of the nozzle, have swivellable rear flaps at the nozzle outlet end. In the ramjet operation, the upper flap is placed in the fully swivelled-out position onto an expansion ramp on the aircraft assigned to the engine. In the turbojet operation, when the rear flaps are swivelled in to a position narrowing the hot-gas flow duct, controls open an air duct via which the boundary layer air is blown from the engine inlet into the hot-gas jet in the area of the expansion ramp downstream of the upper rear flap. The problems in the case of engines of this type are, on the one hand, the high mechanical constructional and mainly sealing expenditures for the swivellable propelling nozzle flaps and, on the other hand, the reduction of propulsion which is particularly pronounced in critical flying conditions. Thus, in the transonic operation, there is an extremely disturbing vacuum zone on the underside of the engine and an increase of the tail resistance which are caused by a wake forming during the swivelled-in condition of the nozzle flaps on the divergent end of the propelling nozzle outer wall because of a separation of the ambient flow. In addition, in the starting and/or change-over phase from the turbo-operation to the ramjet operation, there are clear losses of propulsion because the achievable cross-sectional changes of the hot-gas flow duct are not sufficient for a propulsion-optimal adaptation to the drastically changing hot-gas volume flow.

There is therefore needed a jet engine of the initially mentioned type developed in such a manner that the geometry of the propelling-nozzle-limited hot gas flow duct can be adapted in a constructively simple manner with a high propulsion efficiency to extensively differing operating conditions, as they occur particularly in the case of the described hypersonic ducted engines.

According to the present invention, these needs are met by an air-breathing jet engine, particularly a hypersonic ducted engine, having at least one combustion chamber and a propelling nozzle connected behind it, with a nozzle outer wall which is fixed to the engine and is divergent in the direction of the nozzle outlet end. An axially movable propelling nozzle adjusting part for the bounding of a hot gas flow duct is provided with a variable cross-section. On the outlet end of the nozzle outer wall fixed to the engine, a secondary-air injection is provided. The secondary-air injection can be connected selectively as a function of the axial position of the propelling nozzle adjusting part, by way of an air outlet duct. The air outlet duct is formed in the moved-in condition of the adjusting part and encloses the nozzle outer wall in a ring-shaped manner. The adjusting part is constructed as an annular wall which, in the moved-in condition, bounds the air outlet duct on the outer circumferential side and, in the moved-out position, is constructed as a propelling nozzle lengthening which connects essentially in the corresponding shape divergently to the outlet end of the nozzle outer wall.

According to the present invention, using the axially movable, bell-shaped divergent propelling nozzle lengthening, in conjunction with the claimed central-body adjustability, in a constructionally simple, low-leakage manner, a course of the cross-section of the hot-gas flow duct limited by the nozzle contour that is highly variable with respect to the outlet surface size as well as with respect to the nozzle throat surface size, is obtained on the one hand. Thus, the propelling nozzle can be adapted without any problems with high propelling efficiency to extremely different nozzle pressure conditions. For example, in the case of the above-mentioned change-over from the turbo-operation to the ramjet operation. On the other hand, in conjunction with the annular secondary-air injection connected in the position of the propelling nozzle lengthening withdrawn from the hot-gas jet boundary, at the outlet end of the fixed outer wall of the nozzle, the wake effect which is particularly pronounced there in the transonic range, is effectively reduced. As a result, the tail resistance and the propulsion-reducing vacuum zone are clearly reduced on the underside of the engine, with the additional constructional simplification that the axially movable nozzle lengthening part takes over the expansion of the outer wall of the nozzle not only in the moved-out position but, in addition, in the moved-in condition, also takes over the outer bounding of the air duct and the control of the secondary-air injection.

For the purpose of a further improvement of the propulsion effect, according to an advantageous further development of the invention, the nozzle lengthening part is axially adjustable to a limited degree in the moved-in condition for the control of the air-duct outlet cross-section. This is to achieve, by means of the air injection, an additional gain in thrust that is as large as possible. Also, for reasons of a uniform secondary-air distribution and a constructionally advantageous sealing for the secondary-air supply to the air outlet duct, a distributor ring is preferably provided which reaches around the outer wall of the nozzle. The ring is fixed to the engine, is closed in the circumferential direction and has an annular gap which is open in the direction of the nozzle outlet end. In the moved-in condition of the adjustable nozzle lengthening part, the ring is sealingly enclosed by the latter, in which case the sealing between the distributor ring and the nozzle lengthening part, for the purpose of the preferred adjustability of the air duct cross-section, expediently takes place by means of a sliding seal. The sliding seal acts in the moved-in condition of the lengthening part within a limited axial stroke. The distributor ring is arranged in an advantageous manner with respect to its mounting preferably within the range of the smallest outside diameter of the nozzle wall.

For the disconnecting of the secondary-air injection not required in the moved-out position of the nozzle lengthening part, shut-off elements are expediently provided upstream of the air outlet duct or of the distributor ring.

In the case of engines which operate by a boundary layer suction on the engine inlet in flying conditions without any hot gas duct lengthening via the propelling nozzle part which can be moved out, particularly hypersonic engines in the turbo-operation, in a particularly preferred manner, the boundary layer air is used for the secondary-air injection on the divergent end of the outer wall of the nozzle.

In order to further increase the variation range of the achievable nozzle throat cross-section changes, the central body is adjustably arranged between the narrowest cross-section of the outer nozzle wall fixed to the engine and the outlet plane of the nozzle lengthening in the moved-out position of the divergent nozzle lengthening by means of its largest cross-section.

Finally, a further controlled expansion of the thrust jet is achieved on the downstream side of the moved-out propelling nozzle lengthening, preferably using an expansion ramp fixed to the aircraft which bounds the thrust jet on one side.

Other objects, advantages and novel features of the present invention will become apparent from the following detailed description of the invention when considered in conjunction with the accompanying drawings.

BRIEF DESCRIPTION OF THE DRAWINGS

FIG. 2 is a simplified schematic representation of an enlarged view of the propelling nozzle in the subsonic turbo-operation;

FIG. 3 is a simplified schematic representation of a view corresponding to FIG. 2 of the upper propelling nozzle half in the supersonic turbo-operation; and FIG. 4 is a simplified schematic representation of the propelling nozzle in the ram-air operation, in the upper half of the figure, close to the change-over Mach number and, in the lower half of the figure, in hypersonic flight.

DETAILED DESCRIPTION OF THE DRAWINGS

Figure 1:
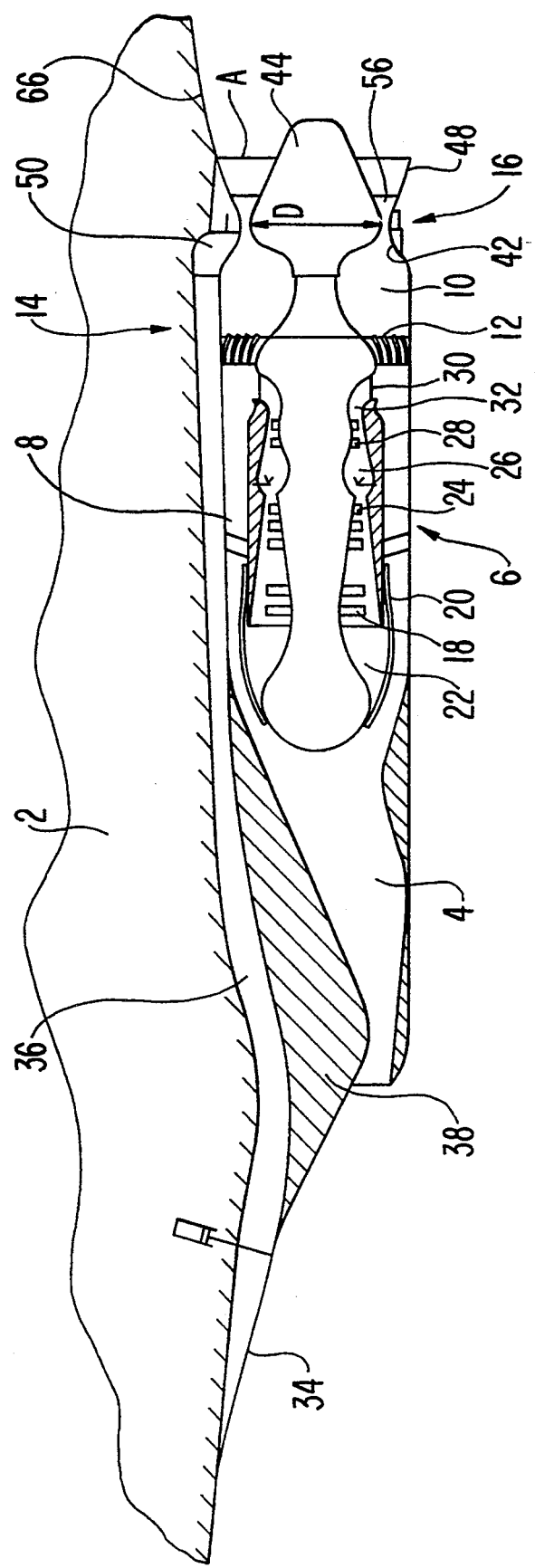
FIG. 1 is a simplified schematic representation of a longitudinal sectional view of a hypersonic ducted engine with the moved-out propelling nozzle lengthening and the central body position of the smallest nozzle throat cross-section in the hypersonic operation.

The hypersonic ducted engine illustrated in FIG. 1, which is fastened to the underside of a hypersonic aircraft 2 not shown in detail, comprises essentially an air inlet 4, an interior turbo-engine 6, a ramjet engine 14 consisting of a ram-air duct 8 and a combustion chamber 10 with injecting devices 12, and a propelling nozzle 16.

The turbo-engine 6 comprises a turbo inlet duct 22, which can be closed by a change-over element and has a low-pressure and a high-pressure compressor 18, 24, a combustion chamber 26, a turbine 28 and a turbo outlet duct 32 which can be closed off by means of an annular slide valve 30.

In the turbo-operation, which is switched on from the take-off to a change-over Mach number of approximately Mach 3 with nozzle pressure ratios of between approximately 4 and 40, the air flowing in via the inlet 4, by way of the then opened change-over element 20, arrives in the turbo inlet duct 22. The air flowing in is compressed by the compressors 18, 24 and is then burnt in the combustion chamber 26 together with hydrogen stored in liquid form. After the output-generating partial expansion in the turbine 28, the hot gas flow is introduced, by way of the also opened annular slide valve 30, into the ram air duct 8. After passing through the injection devices 12 and the combustion chamber 10, which in the turbo-operation starting at approximately 0.9 Mach operates as an afterburner with hydrogen as the fuel, the hot gas flow is relaxed in a thrust generating manner in the nozzle 16. For the suction of the fuselage boundary layer upstream of the air inlet 4 in the turbo-operation, a closing flap 34 is provided which is illustrated in FIG. 1 in the closed position and which is followed by a boundary layer duct 36 extending between the aircraft underside and the hypersonic engine to the engine rear.

In the ramjet operation, which is switched on from the change-over Mach number to hypersonic flying speeds of more than Mach 6 with nozzle pressure ratios of between approximately 35 and 500, the change-over element 20 and the annular slide valve 30, as well as the closing flap 34, are closed so that the turbo-engine 6 and the boundary layer duct 36 are deactivated. The whole air flow is blast-compressed on the inlet side by an adjustable ramp arrangement 38 and flows via the ram air duct 8 into the combustion chamber 10 where it is burnt together with hydrogen supplied by way of the injection devices 12, and subsequently expands in a thrust-generating manner in the hot gas flow duct bounded by the propelling nozzle 16.

The construction of the propelling nozzle 16 and the different cross-sectional configurations of the hot gas flow duct bounded by it in the different flying conditions are explained in detail by reference to FIGS. 2 through 4. As the main components, the propelling nozzle 16 comprises a convergent-divergent, rotationally symmetrical nozzle outer wall 42 which connects to the cylindrical combustion chamber wall 40. A mushroom-shaped central body 44 is arranged in an axially adjustable manner on a center support 46 fixed to the engine. An axially movable, divergent and also rotationally symmetrical propelling nozzle lengthening part 48 and a cold-air distributor ring 50 which encloses the nozzle outer wall 42 in a ring-shaped manner in the area of the convergent wall section and has an air inlet 52 which is connected to the rearward end of the boundary layer duct 36 are also provided.

In the turbo-operation without afterburning, that is, at flying speeds of up to approximately Mach 0.9, the central body 44 is situated with its largest cross-section D between the narrowest point and the outlet end 54 of the nozzle outer wall 42 and, together with it, bounds a convergent-divergent hot gas flow duct 56 with a circular-ring-shaped nozzle throat cross-section $h_1$. The nozzle lengthening part 48, which is not needed in this flying condition for the expanding of the hot gas duct 56, is withdrawn into the moved-in position. In this position, the nozzle lengthening part 48 forms the outer annular wall of an air outlet duct 58 which connects to the distributor ring 50 and encloses the divergent end of the nozzle outer wall 42 in a ring-shaped manner. In this case, the lengthening part 48 in this position by way of a sliding seal 60 interacts with an annular gap 62 of the distributor ring 50 which is opened in the direction of the nozzle outlet end. In this manner, the boundary layer air which is separated in this condition on the inlet side is blown in by way of the air outlet duct 58 bounded between the nozzle outer wall 42 and the lengthening part 48, along the whole outer circumference of the outlet end 54, whereby not only an additional thrust effect is achieved but mainly the wake zone 64 is effectively reduced, which is otherwise formed in this flying condition between the thrust jet, shown by interrupted lines in the figures, downstream of the nozzle outer wall 42 and the ambient air flow (illustrated by a dash-dotted line).

FIG. 3 shows the propelling nozzle 16 in the turbo-operation close to the change-over Mach number. The central body 44 is adjusted on the support 46 with the largest central body diameter D to the outlet cross-section of the fixed nozzle outer wall 42 so that the nozzle throat cross-section is enlarged to $h_2$. Furthermore, the nozzle lengthening part 48 is situated in the moved-in condition but, because of the sliding seal effect, is in this case axially adjustable to a limited degree without any sealing loss with respect to the annular gap 62, and thus permits a control of the effective flow cross-section of the air outlet duct 58, via which, according to FIG. 3, boundary layer air continues to be blown out into the wake zone 64, but now via a significantly reduced flow cross-section.

In the upper half, FIG. 4 shows the propelling nozzle 16 shortly after the change-over to the ram air operation. The nozzle lengthening part 48 was moved from the moved-in position interacting with the sliding seal 60 toward the rear into the moved-out position in which it is connected in a divergent manner in the corresponding shape to the outlet end 54 of the nozzle outer wall 42, whereby the expansion ratio of the nozzle outer contour is clearly increased to a value corresponding to the outlet area A of the lengthening part 48 relative to the smallest cross-sectional surface E of the nozzle outer wall 42. In this flying condition, the thrust jet reaches to the ambient flow so that the disturbing effect of a wake zone on the outlet end of the hot gas flow duct is eliminated, and the air outlet duct 58 for the secondary air injection is no longer needed. The boundary layer separation is also no longer necessary, and the closing flap 34 is swivelled into the closed position illustrated in FIG. 1. The central body 44 is situated in the rear end position in which its largest cross-sectional surface D is disposed in the outlet plane A of the divergent lengthening part 48, and the nozzle throat cross-section $h_3$ of the hot gas flow duct 56 therefore reaches its maximal value.

In the case of a further increase of the flying speed to approximately Mach 7, the central body 44, while the nozzle throat cross-section is reduced continuously (and while the hot gas outlet surface at the divergent end of the nozzle lengthening part 48 is correspondingly enlarged in the opposite direction), is displaced toward the front until the largest central body cross-section D is situated in the plane E of the smallest outside diameter of the nozzle wall and therefore the hot gas flow duct 56 bounded by the propelling nozzle has reached its minimal nozzle throat cross-section $h_4$ and the maximal expansion ratio (lower half of FIG. 4; and FIG. 1). For the purpose of a controlled thrust jet expansion downstream of the moved-out propelling nozzle lengthening 48, an expansion ramp 66 which connects to it in a corresponding shape is arranged on the tail end of the aircraft 2 for the one-sided bounding of the thrust jet.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A jet engine having an upstream and downstream end and an axial direction, comprising at least one combustion chamber and a propelling nozzle connected downstream of said combustion chamber, a nozzle outer wall which is fixed to the engine and is divergent in the direction of an outlet end, and an axially adjustable divergent/convergent central body for bounding a hot gas flow duct with a variable cross-section, wherein the propelling nozzle has a propelling nozzle adjusting part which is axially movable for an outlet-side expansion of the hot gas flow duct and connects, in its downstream position, to the outlet end of the nozzle outer wall fixed to the engine, said central body being, axially adjustable such that a largest cross-section of said central body extends into an area formed by the propelling nozzle adjusting part in its downstream position.

2. A jet engine according to claim 1, wherein the central body can be adjusted such that the largest cross-section is located in an outlet plane of the propelling nozzle adjusting part in the downstream position.

3. A jet engine according to claim 1, wherein downstream of the propelling nozzle, an expansion ramp which, in the position of the propelling nozzle adjusting part, connects to said adjusting part and corresponds to the shape of the adjusting part, said expansion ramp being arranged on an aircraft assigned to the jet engine, for a one-sided bounding of the jet engine.

4. jet engine according to claim 2, wherein downstream of the propelling nozzle, an expansion ramp which, in the position of the propelling nozzle adjusting part, connects to said adjusting part and corresponds to the shape of the adjusting part, said expansion ramp being arranged on an aircraft assigned to the jet engine, for a one-sided bounding of the jet engine.

5. A jet engine according to claim 1, further comprising:
   an air outlet duct being formed in a moved-in condition of the adjusting part and enclosing the nozzle outer wall in a ring-shaped manner, said air outlet duct providing a secondary air injection on an outlet end of the nozzle outer wall fixed to the engine, an amount of said secondary air injection being selectively varied as a function of the axial position of the axially movable propelling nozzle adjusting part;

wherein said adjusting part is constructed as an annular wall which, in its upstream position, bounds the air outlet duct on an outer circumferential side and, in a downstream position, forms a lengthening portion of the propelling nozzle which extends the outlet end of said nozzle outer wall in a substantially similar divergent shape.

6. A jet engine according to claim 5, further comprising: means for adjusting the propelling nozzle adjusting part to limited degree in an axial direction when in its upstream position for changing an effective flow cross-section of the air outlet duct.

7. A jet engine according to claim 5, wherein upstream of the air outlet duct, shut-off elements are provided for disconnecting the secondary air injection in the downstream position of the propelling nozzle adjusting part.

8. A jet engine according to claim 5, wherein for the secondary air injection, boundary layer air is provided which is separated at an engine inlet in the upstream position of the propelling nozzle adjusting part.

9. A jet engine having an upstream and downstream end and an axial direction, comprising at least one combustion chamber and a propelling nozzle connected downstream of said combustion chamber, a nozzle outer wall which is fixed to the engine and is divergent in the direction of an outlet end, and an axially adjustable divergent/convergent central body for bounding a hot gas flow duct with a variable cross-section, wherein the propelling nozzle has a propelling nozzle adjusting part which is axially movable for an outlet-side expansion of the hot gas flow duct and connects, in its downstream position, to the outlet end of the nozzle outer wall fixed to the engine, said central body being, axially adjustable such that a largest cross-section of said central body extends into an area formed by the propelling nozzle adjusting part in its downstream position;

an air outlet duct being formed in a moved-in condition of the adjusting part and enclosing the nozzle outer wall in a ring-shaped manner, said air outlet duct providing a secondary air injection on an outlet end of the nozzle outer wall fixed to the engine, an amount of said secondary air injection being selectively varied as a function of the axial position of the axially movable propelling nozzle adjusting part;

wherein said adjusting part is constructed as an annular wall which, in its upstream position, bounds the air outlet duct on an outer circumferential side and, in a downstream position, forms a lengthening portion of the propelling nozzle which extends the outlet end of said nozzle outer wall in a substantially similar divergent shape;

wherein for the secondary air of the air outlet duct, a distributor ring is provided which extends around the nozzle outer wall, is fixed to the engine and has an annular gap which is open in the direction of the nozzle outlet end and, in the upstream position of the propelling nozzle adjusting part, is sealingly enclosed by the adjusting part;

wherein for the secondary air injection, boundary layer air is provided which is separated at an engine inlet in the upstream position of the propelling nozzle adjusting part.

10. A jet engine having an upstream and downstream end and an axial direction, comprising at least one combustion chamber and a propelling nozzle connected downstream of said combustion chamber, a nozzle outer wall which is fixed to the engine and is divergent in the direction of an outlet end, and an axially adjustable divergent/convergent central body for bounding a hot gas flow duct with a variable cross-section, wherein the propelling nozzle has a propelling nozzle adjusting part which is axially movable for an outlet-side expansion of the hot gas flow duct and connects, in its downstream position, to the outlet end of the nozzle outer wall fixed to the engine, said central body being, axially adjustable such that a largest cross-section of said central body extends into an area formed by the propelling nozzle adjusting part in its downstream position;

an air outlet duct being formed in a moved-in condition of the adjusting part and enclosing the nozzle outer wall in a ring-shaped manner, said air outlet duct providing a secondary air injection on an outlet end of the nozzle outer wall fixed to the engine, an amount of said secondary air injection being selectively varied as a function of the axial position of the axially movable propelling nozzle adjusting part;

wherein said adjusting part is constructed as an annular wall which, in its upstream position, bounds the air outlet duct on an outer circumferential side and, in a downstream position, forms a lengthening portion of the propelling nozzle which extends the outlet end of said nozzle outer wall in a substantially similar divergent shape;

further comprising: means for adjusting the propelling nozzle adjusting part to limited degree in an axial direction when in its upstream position for changing an effective flow cross-section of the air outlet duct;

wherein for the secondary air injection of the air outlet duct, a distributor ring is provided which extends around the nozzle outer wall, is fixed to the engine and has an annular gap which is open in the direction of the nozzle outlet end and, in the upstream position of the propelling nozzle adjusting part, is sealingly enclosed by the adjusting part.

11. A jet engine according to claim 10, wherein between the distributor ring and the propelling nozzle adjusting part, a sliding seal is provided which acts within an axial adjusting range in the upstream position of the adjusting part.

12. A jet engine having an upstream and downstream end and an axial direction, comprising at least one combustion chamber and a propelling nozzle connected downstream of said combustion chamber, a nozzle outer wall which is fixed to the engine and is divergent in the direction of an outlet end, and an axially adjustable divergent/convergent central body for bounding a hot gas flow duct with a variable cross-section, wherein the propelling nozzle has a propelling nozzle adjusting part which is axially movable for an outlet-side expansion of the hot gas flow duct and connects, in its downstream position, to the outlet end of the nozzle outer wall fixed to the engine, said central body being, axially adjustable such that a largest cross-section of said central body extends into an area formed by the propelling nozzle adjusting part in its downstream position;

an air outlet duct being formed in a moved-in condition of the adjusting part and enclosing the nozzle outer wall in a ring-shaped manner, said air outlet duct providing a secondary air injection on an outlet end of the nozzle outer wall fixed to the engine, an amount of said secondary air injection being selectively varied as a function of the axial position of the axially movable propelling nozzle adjusting part;

wherein said adjusting part is constructed as an annular wall which, in its upstream position, bounds the air outlet duct on an outer circumferential side and, in a downstream position, forms a lengthening portion of the propelling nozzle which extends the outlet end of said nozzle outer wall in a substantially similar divergent shape;

wherein for the secondary air of the air outlet duct, a distributor ring is provided which extends around the nozzle outer wall, is fixed to the engine and has an annular gap which is open in the direction of the nozzle outlet end and, in the upstream position of the propelling nozzle adjusting part, is sealingly enclosed by the adjusting part.

13. A jet engine according to claim 12, wherein the distributor ring is arranged in the area of a smallest outside diameter E of the nozzle outer wall.

14. A jet engine according to claim 12, wherein upstream of the air outlet duct, shut-off elements are provided for disconnecting the secondary air injection in the downstream position of the propelling nozzle adjusting part.

15. A jet engine according to claim 12, wherein between the distributor ring and the propelling nozzle adjusting part, a sliding seal is provided which acts within an axial adjusting range in the upstream position of the adjusting part.

16. A jet engine according to claim 15, wherein the distributor ring is arranged in the area of a smallest outside diameter E of the nozzle outer wall.

17. A jet engine according to claim 15, wherein upstream of the air outlet duct, shut-off elements are provided for disconnecting the secondary air injection in the downstream position of the propelling nozzle adjusting part.

18. A jet engine according to claim 15, wherein for the secondary air injection, boundary layer air is provided which is separated at an engine inlet in the upstream position of the propelling nozzle adjusting part.

* * * * *